United States Patent
Dharia et al.

(10) Patent No.: US 11,665,450 B2
(45) Date of Patent: *May 30, 2023

(54) SENSOR READ OUT MODE FOR HIGH RESOLUTION AND LOW LIGHT IMAGING IN-SYNC WITH LIDAR TIMING

(71) Applicant: Waymo LLC, Mountain View, CA (US)

(72) Inventors: Nirav Dharia, Milpitas, CA (US); Xiaoying He, Mountain View, CA (US); Benjamin Frevert, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,811

(22) Filed: Jan. 7, 2022

(65) Prior Publication Data
US 2022/0210362 A1 Jun. 30, 2022

Related U.S. Application Data

(63) Continuation of application No. 16/688,443, filed on Nov. 19, 2019, now Pat. No. 11,252,366.

(51) Int. Cl.
*H04N 25/71* (2023.01)
*G06T 5/50* (2006.01)
(Continued)

(52) U.S. Cl.
CPC .......... *H04N 25/745* (2023.01); *G01S 17/86* (2020.01); *G06T 5/50* (2013.01); *H04N 25/42* (2023.01);
(Continued)

(58) Field of Classification Search
CPC ...... H04N 5/3765; H04N 5/343; H04N 5/345; H04N 5/361; H04N 5/378; G01S 17/86; G06T 5/50; G06T 2207/20224
See application file for complete search history.

(56) References Cited

U.S. PATENT DOCUMENTS 5,988,862 A   11/1999   Kacyra et al.
6,320,618 B1  11/2001   Aoyama
(Continued)

FOREIGN PATENT DOCUMENTS

| JP | 5852706 | 10/2014 |
| KR | 10-1899549 | 9/2018 |
| WO | 2015/046735 | 3/2019 |

OTHER PUBLICATIONS

Horaud et al. "An Overview of Depth Cameras and Range Scanners Based on Time-of-Flight Technologies," Machine Vision and Applications, 2016, pp. 1005-1020, vol. 27, No. 7.
(Continued)

*Primary Examiner* — Amy R Hsu
(74) *Attorney, Agent, or Firm* — McDonnell Boehnen Hulbert & Berghoff LLP

(57) ABSTRACT

This disclosure describes devices, systems, and methods that relate to obtaining image frames with variable resolutions in synchronization with a clock source. An example device may include an image sensor, a clock input, and a controller. The controller includes at least one processor and a memory. The at least one processor is operable to execute program instructions stored in the memory so as to carry out operations. The operations include receiving, by the clock input, a clock signal. The clock signal is a periodic signal defining at least one scan interval. The operations also include during the scan interval, causing the image sensor to capture a full resolution image frame. The operations yet further include (Continued)

during the scan interval, causing the image sensor to capture at least one reduced resolution image frame.

20 Claims, 10 Drawing Sheets

(51) Int. Cl.
   *G01S 17/86* (2020.01)
   *H04N 25/42* (2023.01)
   *H04N 25/44* (2023.01)
   *H04N 25/63* (2023.01)
   *H04N 25/75* (2023.01)

(52) U.S. Cl.
   CPC ............ *H04N 25/44* (2023.01); *H04N 25/63* (2023.01); *H04N 25/75* (2023.01); *G06T 2207/20224* (2013.01)

(56) References Cited

U.S. PATENT DOCUMENTS

| | | | |
|---|---|---|---|
| 6,473,122 | B1 | 10/2002 | Kanekal |
| 7,227,116 | B2 | 6/2007 | Gleckler |
| 7,728,900 | B2 | 6/2010 | Fukushima et al. |
| 8,477,190 | B2 | 7/2013 | Giuffrida et al. |
| 9,157,988 | B2 | 10/2015 | Cho et al. |
| 9,578,234 | B2 | 2/2017 | Tran |
| 9,983,590 | B2 | 5/2018 | Templeton et al. |
| 10,104,318 | B2 | 10/2018 | Smith et al. |
| 10,191,155 | B2* | 1/2019 | Curatu ................... G01S 7/4861 |
| 10,345,447 | B1* | 7/2019 | Hicks ..................... G01S 7/4863 |
| 2004/0085443 | A1 | 5/2004 | Kallioniemi et al. |
| 2004/0190092 | A1 | 9/2004 | Silverbrook et al. |
| 2008/0291304 | A1* | 11/2008 | Ota ....................... H04N 5/3454 |
| | | | 348/294 |
| 2012/0268727 | A1 | 10/2012 | Schrey et al. |
| 2014/0368702 | A1* | 12/2014 | Kuroda ................. H04N 5/347 |
| | | | 348/297 |
| 2016/0323524 | A1* | 11/2016 | Smith ................... H04N 5/2355 |
| 2016/0337608 | A1* | 11/2016 | Numata ............ H01L 27/14627 |
| 2017/0195596 | A1* | 7/2017 | Vogelsang ............. H04N 5/343 |
| 2017/0269198 | A1* | 9/2017 | Hall ......................... G01S 7/484 |
| 2018/0132726 | A1* | 5/2018 | Dickie .................... G01S 17/88 |
| 2018/0211128 | A1* | 7/2018 | Hotson .................. G06V 10/44 |
| 2018/0299534 | A1* | 10/2018 | LaChapelle ............ G06V 20/58 |
| 2019/0004535 | A1* | 1/2019 | Huang .................. G01S 7/4808 |
| 2019/0079193 | A1* | 3/2019 | Gunnam ............... G01S 7/4808 |
| 2019/0098233 | A1 | 3/2019 | Gassend et al. |
| 2019/0178974 | A1* | 6/2019 | Droz ...................... G01S 7/4815 |
| 2019/0260385 | A1* | 8/2019 | Niwa ..................... H04N 5/374 |
| 2019/0271767 | A1* | 9/2019 | Keilaf ................... G01S 7/4817 |
| 2019/0311546 | A1* | 10/2019 | Tay ....................... G05D 1/0088 |
| 2020/0103507 | A1* | 4/2020 | Kirillov ................ G01S 7/4817 |
| 2020/0125890 | A1* | 4/2020 | Donahue .............. G06V 10/758 |
| 2020/0174107 | A1* | 6/2020 | Briggs ................... H04N 5/247 |
| 2021/0072398 | A1* | 3/2021 | Matsunaga ............. G01S 17/93 |
| 2021/0114616 | A1* | 4/2021 | Altman ................. H04W 8/205 |

OTHER PUBLICATIONS

International Searching Authority, International Search Report and Written Opinion dated Mar. 16, 2021, issued in connection with International Patent Application No. PCT/US202/060960 filed on Nov. 18, 2020, 9 pages.

* cited by examiner

SENSOR READ OUT MODE FOR HIGH RESOLUTION AND LOW LIGHT IMAGING IN-SYNC WITH LIDAR TIMING

CROSS-REFERENCE TO RELATED APPLICATION

The present application is a continuation of U.S. patent application Ser. No. 16/688,443, filed Nov. 19, 2019, the content of which is herewith incorporated by reference.

BACKGROUND

A sensor system may include several different types of sensors, such as image capture systems (e.g., cameras), radars, and/or light detection and ranging (LIDAR or Lidar) systems. Such sensor systems may be utilized, for example, in conjunction with autonomous or semi-autonomous robots and/or vehicles (e.g., self-driving cars/trucks). One challenge with these types of sensor systems is synchronizing image capture (using a camera) and lidar scans. For example, conventional systems are not designed to capture high resolution images as well as low light images using the same camera in a synchronized manner during a single lidar scan interval.

SUMMARY

The present disclosure generally relates to sensor systems and methods that provide temporally coordinated sensor information from at least two different types of sensors.

In a first aspect, a device is provided. The device includes an image sensor, a clock input, and a controller having at least one processor and a memory. The at least one processor is operable to execute program instructions stored in the memory so as to carry out operations. The operations include receiving, by the clock input, a clock signal. The clock signal is a periodic signal defining at least one scan interval. The operations also include during the scan interval, causing the image sensor to capture a full resolution image frame. The operations yet further include during the scan interval, causing the image sensor to capture at least one reduced resolution image frame.

In a second aspect, a system is provided. The system includes an image sensor, a light detection and ranging (lidar) device, and a controller having at least one processor and a memory. The at least one processor is operable to execute program instructions stored in the memory so as to carry out operations. The operations include causing the lidar device to scan a field of view based on a scan timing sequence. The scan timing sequence includes a plurality of scan intervals. The operations yet further include, during a given scan interval, causing the image sensor to capture a full resolution image frame. The operations additionally include, during the given scan interval, causing the image sensor to capture at least one reduced resolution image frame.

In a third aspect, a method is provided. The method includes, based on a scan timing sequence, causing a lidar device to scan a field of view. The scan timing sequence includes a plurality of scan intervals. The method also includes, during a given scan interval, causing an image sensor to capture a full resolution image frame. The full resolution image frame comprises a correlated double sampling image. The method additionally includes, during the given scan interval, causing the image sensor to capture at least one reduced resolution image frame.

Other aspects, embodiments, and implementations will become apparent to those of ordinary skill in the art by reading the following detailed description, with reference where appropriate to the accompanying drawings.

DETAILED DESCRIPTION

Figure 1:
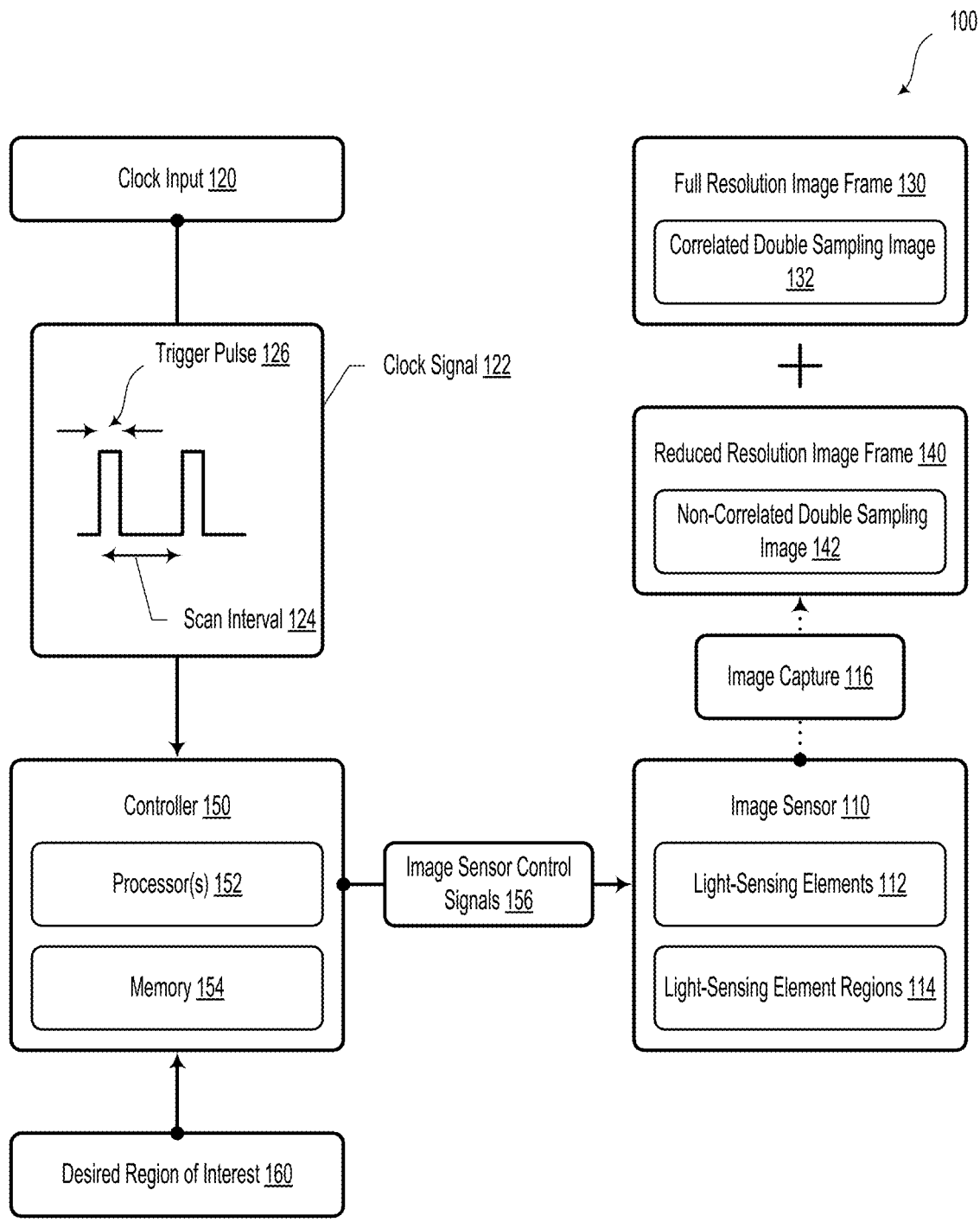
FIG. 1 illustrates a schematic block representation of a device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In conventional sensor systems that include a lidar and a single camera, high resolution images camera images and low-light camera images are captured with asynchronous timing with respect to lidar scan timing. For example, in a conventional "staggered resolution readout mode" or "serial CDS image mode", a lidar scan period could be approximately 100 milliseconds (ms). That is, a lidar could be configured to scan a predetermined region or sector of three-dimensional space during a given lidar scan period. In such conventional scenarios, a 12-megapixel image sensor/camera could be configured to capture a single 12-megapixel "high resolution" correlated double sampling (CDS) image frame followed by a 3-megapixel "low-resolution, low-light" CDS image frame. As an example, the 12-megapixel CDS image frame may have a total exposure and readout time of approximately 60-70 ms. The subsequent 3-megapixel CDS frame may have a total exposure and readout time of approximately 30 ms. However, in some cases, the subsequent low-light CDS image frame could be delayed due to readout time, integration time, and latency such that the low-light CDS image frame is complete more than 30 ms (e.g., 34 ms) after the initial lidar scan period is complete.

Devices, systems, and methods described herein provide various ways to temporally coordinate the various functions of high-resolution image capture, reduced-resolution image capture, and lidar scanning. For example, some embodiments may provide a high-resolution camera image that is temporally and spatially correlated with lidar-based point cloud map data, which are both obtained at a synchronized frame rate. Additionally, embodiments provide the capability to capture one or more reduced-resolution images using the same camera, all performed during a single lidar scan interval.

Other aspects, embodiments, and implementations will become apparent to those of ordinary skill in the art by reading the following detailed description, with reference where appropriate to the accompanying drawings.

II. Example Devices

FIG. 1 illustrates a schematic block representation of a device 100, according to an example embodiment. Device 100 includes an image sensor 110 and a clock input 120. In example embodiments, the image sensor 110 could include a plurality of light-sensing elements 112. The plurality of light-sensing elements 112 are spatially grouped into a plurality of light-sensing regions 114 (e.g., a plurality of low-resolution pixels). The image sensor 110 is configured to capture the full resolution image frame 130 and a further image frame (e.g., a reduced resolution image frame 140) corresponding to at least one light-sensing region 114 during a single scan interval 124.

In some embodiments, the image sensor 110 could include a charge-coupled device (CCD) sensor, a complementary metal-oxide-semiconductor (CMOS) sensor, and/or an active pixel sensor. It will be understood that other types of image sensors are possible and contemplated within the context of the present disclosure.

In some embodiments, the image sensor 110 could include more than 12 million light-sensing elements 112 (e.g., 12 megapixels, 15 megapixels, or more).

The device 100 also includes a controller having at least one processor 152 and a memory 154. In some embodiments, the controller 150 may include at least one of a field-programmable gate array (FPGA) or an application-specific integrated circuit (ASIC). Additionally or alternatively, the at least one processors 152 may include a general-purpose processor or a special-purpose processor (e.g., digital signal processors, etc.). The processors 152 may be configured to execute computer-readable program instructions that are stored in the memory 154. In some embodiments, the processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

In some embodiments, the operations could include receiving, by the clock input 120, a clock signal 122. In such scenarios, the clock signal 122 is a periodic signal defining at least one scan interval 124. The clock signal 122 could be an analog or digital signal that oscillates between at least a high state (e.g., +5 volts) and a low state (e.g., −5 volts). In some embodiments, the clock signal 122 could be utilized as a trigger for a synchronous digital circuit. In an example embodiment, the clock signal 122 could be generated by a clock signal generator. In some scenarios, the clock signal generator could be a part of, and/or coupled to, the device 100. Alternatively, the clock signal generator need not be physically disposed proximate to the device 100.

The operations also include, during the scan interval 124, causing the image sensor 110 to capture a full resolution image frame 130. In some embodiments, the full resolution image frame 130 could include a correlated double sampling (CDS) image.

As used herein, correlated double sampling could include a method to measure voltages or currents so as to remove an undesired signal (or lack thereof) associated with defective pixels (e.g., "dead" or "stuck" pixels). For example, when measuring the image sensor outputs, the output of the sensor could be measured twice. In such a process, the sensor output may be measured once in a "known" condition and once in an "unknown" condition. The value measured from the known condition is then subtracted from the unknown condition to generate a value with a known relation to the physical quantity being measured—in this case, photons received from an environment.

In some embodiments, correlated double sampling may be utilized as a noise reduction technique. For example, a reference voltage of a given image sensor pixel (i.e., the pixel's voltage after it is reset) could be subtracted from the signal voltage of the pixel (i.e., the pixel's voltage at the end of integration) at the end of each integration period. Such a subtraction may offset and/or otherwise mitigate thermal noise (e.g., kTC noise) associated with the capacitance of the respective light-sensing elements of the image sensor.

The operations additionally include, during the scan interval 124, causing the image sensor 110 to capture at least one reduced resolution image frame 140. In some embodiments, the reduced resolution image frame 140 could be a non-correlated double sampling image. That is, the reduced resolution image frame 140 could be read out from the image sensor without performing an image subtraction or normalization.

In some embodiments, the operations could also include receiving information indicative of a desired region of interest 160. In such scenarios, causing the image sensor 110 to capture the at least one reduced resolution image frame 140 could include causing the image sensor 110 to capture a further image frame (e.g., second reduced resolution image frame 140b described in reference to FIG. 2). The further image frame could correspond to the desired region of interest 160 during a given scan interval 124.

Figure 2:
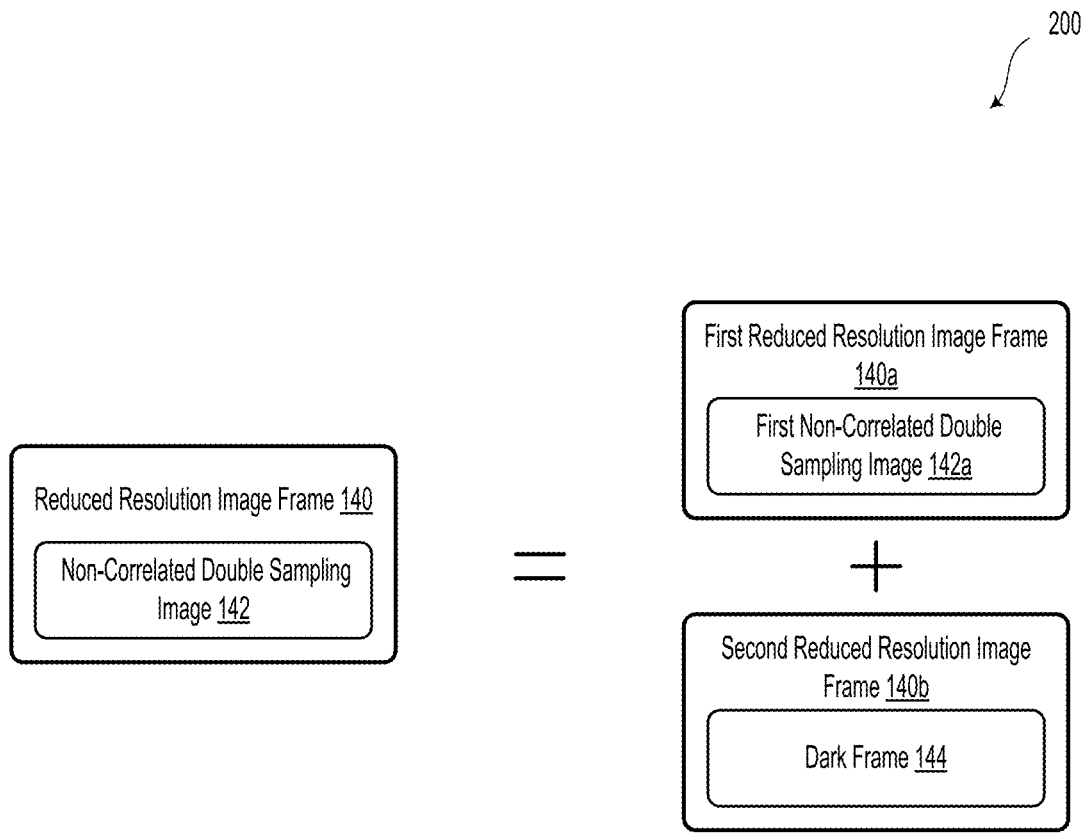
FIG. 2 illustrates a portion of the device of FIG. 1, according to an example embodiment.

FIG. 2 illustrates a portion 200 of the device 100 of FIG. 1, according to an example embodiment. As illustrated in FIG. 2, capturing the at least one reduced resolution image frame 140 could include capturing a first reduced resolution image frame 140a using image sensor 110. In such scenarios, the first reduced resolution image frame 140a could include a first non-correlated double sampling image 142a.

In an example embodiment, the first non-correlated double sampling image 142a could be obtained from the same exposure as that of the full resolution image frame 130. In such scenarios, the first reduced resolution image frame 140a could be provided more quickly than a CDS image because a further exposure is not needed.

As illustrated in FIG. 2, capturing the at least one reduced resolution image frame 140 could additionally include capturing a second reduced resolution image frame 140b. In such scenarios, the second reduced resolution image frame 140b could include a dark frame 144. In some embodiments, the second reduced resolution image frame 140b could be provided using the image sensor 110 based on a short "dark" exposure time period followed by a read out period.

In some embodiments, the dark frame 144 could be captured utilizing the same exposure time, ISO sensitivity, and ambient temperature as the first reduced resolution image frame 140a. However, it will be understood that the dark frame 144 could be obtained using other exposure parameters. In some scenarios, an opaque shutter mechanism could be utilized to prevent light from reaching the image sensor 110 while capturing the dark frame 144.

In some embodiments, the dark frame 144 would be utilized for sensor noise subtraction. In such scenarios, the dark frame 144 could be read out with a closed charge transfer gate TX. Accordingly, the image may be read out as a dark frame, but may include the same or similar noise as a CDS image. It will be understood that other ways to capture the dark frame 144 so as to obtain sensor noise information are possible and contemplated.

Furthermore, the operations performed by the controller 150 could include performing a dark image subtraction on the first reduced resolution image frame 140a based on the second reduced resolution image frame 140b. In such scenarios, the dark image subtraction could correct for fixed-pattern noise such as that associated with dark current and/or "amp glow". Visible fixed-pattern noise can be caused by "hot pixels" (e.g., pixels with higher than normal dark current), stuck pixels, and/or flickering pixels.

In some embodiments, the full resolution image frame 130 is formed from information received from each of the plurality of light-sensing elements 112. For example, in cases where the image sensor 110 has 12 million light-sensing elements 112, a corresponding full resolution image 130 may include a 12 megapixel resolution.

Furthermore, the reduced resolution image frame 140 is formed from information received from a subset of the plurality of light-sensing elements 112. That is, in the case where the image sensor 110 has 12 million light-sensing elements 112, a corresponding reduced resolution image frame 140 could include a 3 megapixel resolution.

In some embodiments, the scan interval 124 could be less than 40 milliseconds. For example, the scan interval 124 could correspond to a clock signal 122 (e.g., a lidar clock signal) with a period of about 30 milliseconds. However, it will be understood that longer or shorter scan intervals are possible and contemplated.

Figure 4:
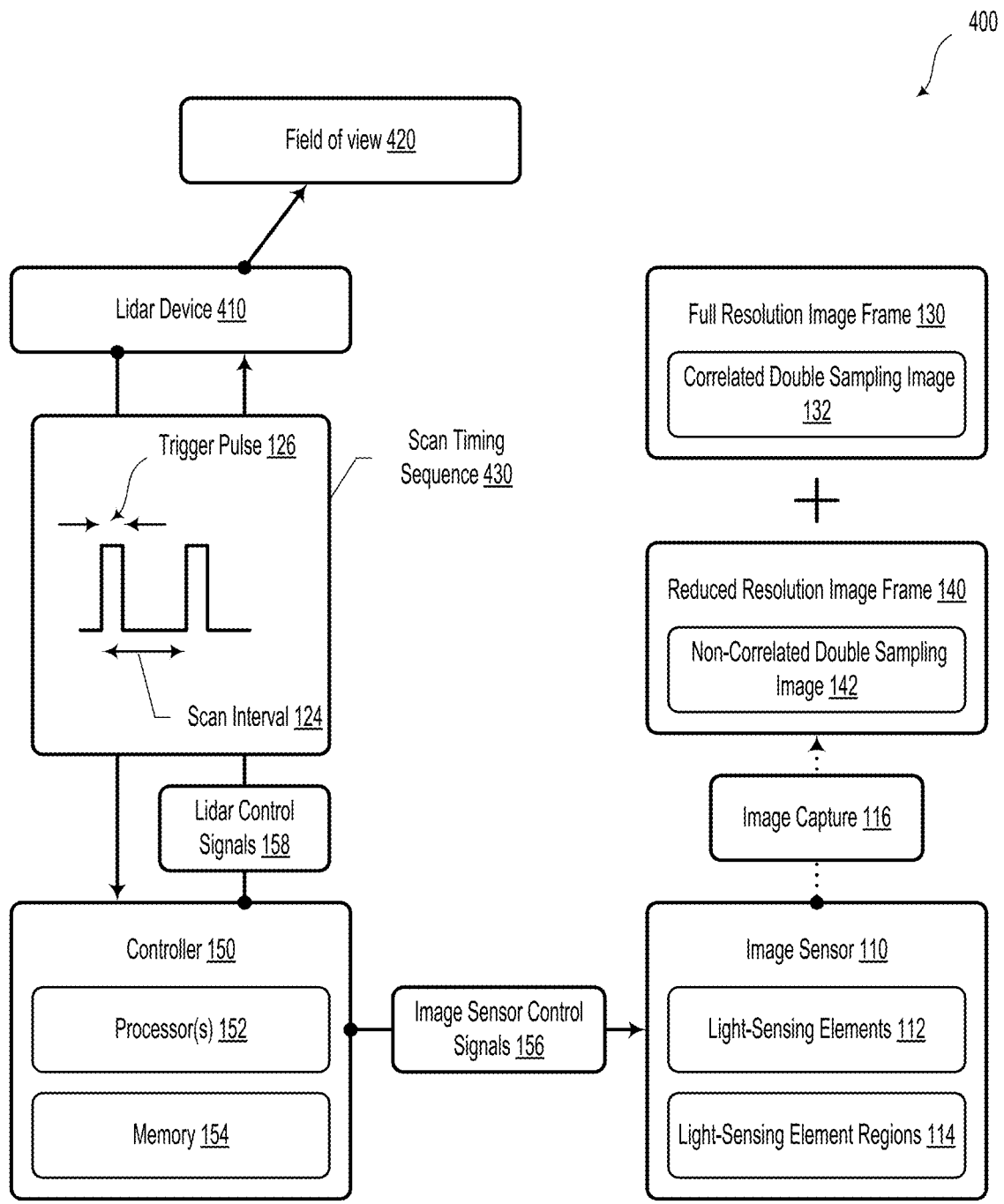
FIG. 4 illustrates a schematic block representation of a system, according to an example embodiment.

In various examples, the clock input 120 could be based on a scan timing sequence 430 of a light detection and ranging (lidar) device (e.g., lidar device 410) as illustrated and described in reference to FIG. 4.

In such scenarios, the full resolution image frame 130 could be captured while the lidar device is scanning a field of view (e.g., field of view 420). Additionally or alternatively, the at least one reduced resolution image frame 140 can be captured while the lidar device is not scanning the field of view.

Figure 3A:
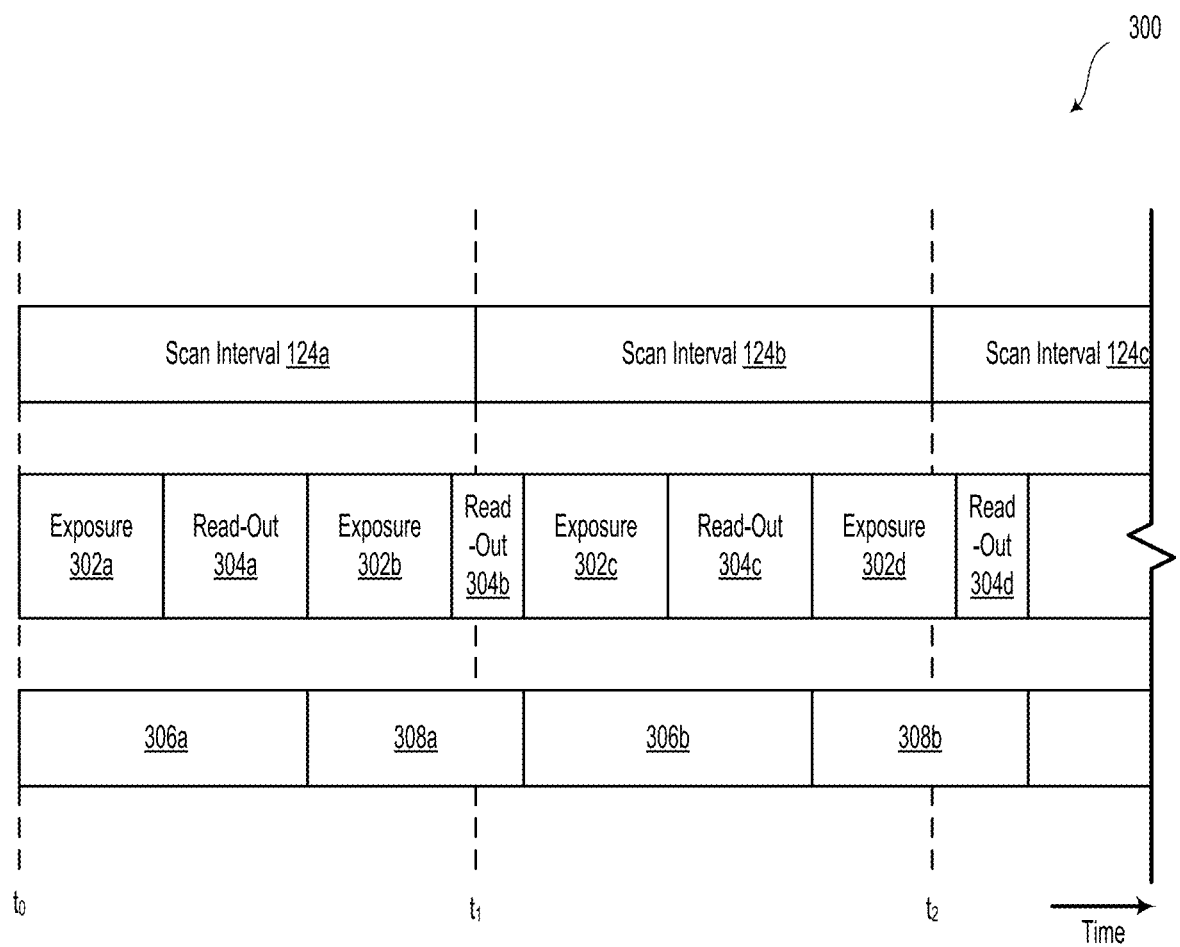
FIG. 3A illustrates an operating scenario, according to an example embodiment.

FIG. 3A illustrates an operating scenario 300, according to an example embodiment. Operating scenario 300 could illustrate a "serial image capture" scenario. As an example, to provide a first full resolution CDS image frame 306a, during scan interval 124a (e.g., between to and ti), the image sensor 110 could be exposed to light and accumulate charge during exposure 302a and the accumulated charge could be read out during read out 304a. Furthermore, to provide a first reduced resolution CDS image frame 308a, the image sensor 110 could again be exposed to light and accumulate charge during exposure 302b and the corresponding accumulated charge could be read out during read out 304b.

The serial image capture process illustrated in operating scenario 300 could continue during scan intervals 124a, 124b, and 124c. For example, a second full resolution image frame 306b could be captured over exposure 302c and read out 304c and a second reduced resolution image frame 308b could be captured over exposure 302d and read out 304d. However, the serial capture process may result in image frames that are not synced with the scan intervals 124a-c or clock signal 122. Accordingly, the information about objects and other features in the image frames captured in operating scenario 300 may be more difficult to incorporate and/or compare to other types of information captured about the environment obtained based on the scan intervals 124a-c. For example, in the case of a lidar device, image sensor data captured in a serial capture process could be spatially offset with respect to lidar data and/or more difficult to utilize for sensor fusion and/or other perception determinations.

Figure 3B:
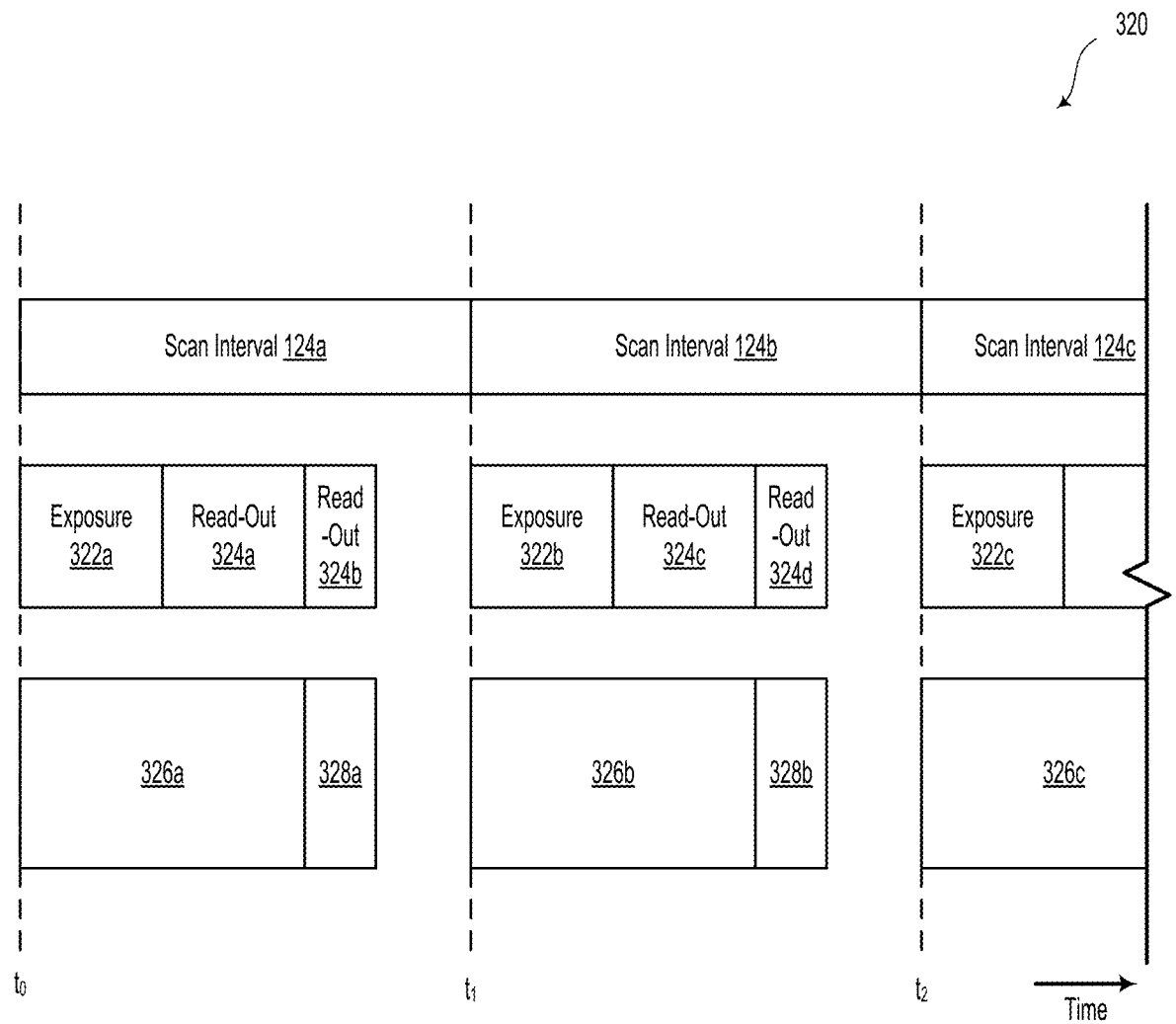
FIG. 3B illustrates an operating scenario, according to an example embodiment.

FIG. 3B illustrates an operating scenario 320, according to an example embodiment. Operating scenario 320 could include, during scan interval 124a, capturing a first full resolution image frame 326a during exposure 322a and read-out 324a. Subsequently, a first reduced resolution non-CDS image frame 328a could be captured during read-out 324b. The first reduced resolution non-CDS image frame 328a could utilize the same exposure 322a as the first full resolution image frame 326a. However, due to the non-CDS property of the first reduced resolution image frame 328a, the resulting image could be noisier or otherwise of less quality than an equivalent CDS reduced resolution image frame.

During subsequent scan intervals (e.g., scan intervals 124b and 124c), a second full resolution image frame 326b could be captured during exposure 322b and read-out 324c and a second reduced resolution image frame 328b could be captured during read-out 324d. Although only partially illustrated, a third full resolution image frame 326c could be captured during exposure 322c and a corresponding read-out time.

By operating according to operating scenario 320, the device 100 could provide full and reduced resolution image frames that are in synchronization with the scan intervals 124a-c. By synchronizing with the scan intervals 124a-c, sensor fusion and/or perception tasks could be made more efficient and less computationally-intensive.

Figure 3C:
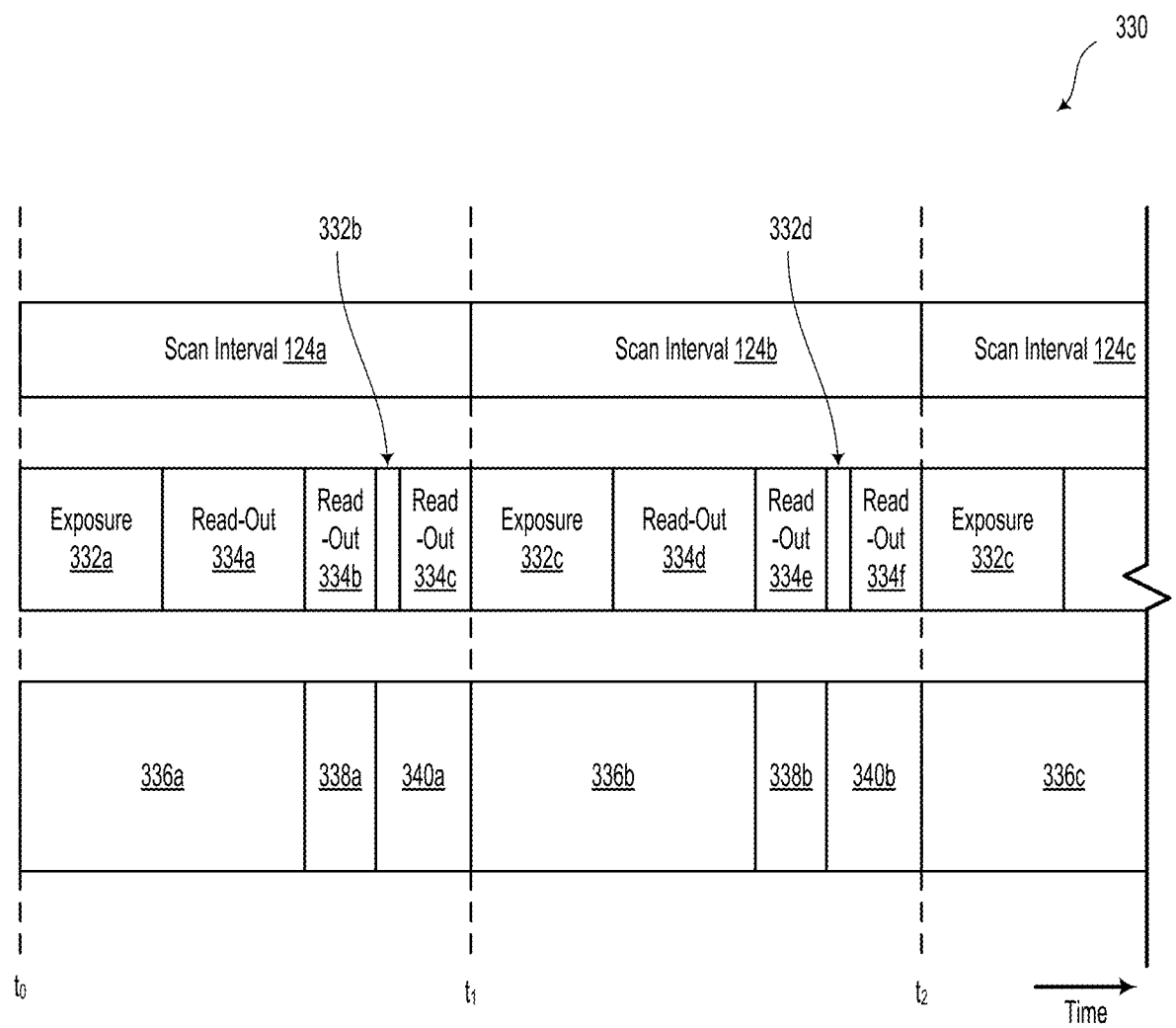
FIG. 3C illustrates an operating scenario, according to an example embodiment.

FIG. 3C illustrates an operating scenario 330, according to an example embodiment. Operating scenario 330 includes capturing a first full resolution image frame 336a corresponding to exposure 332a and read-out 334a. Afterwards, the operating scenario 330 includes capturing a first reduced resolution image frame 338a during read-out 334b. Next, the operating scenario 330 includes capturing a dark frame 340a associated with exposure 332b and read-out 334c. In operating scenario 330, the first reduced resolution image frame 338a could be non-CDS, while the dark frame 340a could be an image obtained with a closed charge transfer gate (e.g., a "closed" electronic shutter) or with a closed physical shutter.

In subsequent scan intervals 124b and 124c, the capture sequence could repeat with capturing a second full resolution image frame 336b, a second reduced resolution image frame 338b, and a second dark frame 340b.

By utilizing such an operating mode, the device 100 could be configured to provide a full resolution image frame and a dark-current-corrected reduced resolution image frame during each scan interval.

III. Example Systems

FIG. 4 illustrates a schematic block representation of a system 400, according to an example embodiment. System 400 could include elements that may be similar or identical to that of device 100, illustrated and described in relation to FIG. 1. For example, system 400 includes an image sensor 110.

System 400 also includes a light detection and ranging (lidar) device 410. Lidar device 410 could be configured to provide information (e.g., point cloud data) about one or more objects (e.g., location, shape, etc.) in a given environment. In an example embodiment, the lidar system could provide point cloud information, object information, mapping information, or other information to a vehicle. The vehicle could be a semi- or fully-automated vehicle. For instance, the vehicle could be a self-driving car, an autonomous drone aircraft, an autonomous truck, or an autonomous robot. Other types of vehicles and LIDAR systems are contemplated herein.

Furthermore, system 400 also includes a controller 150 that includes at least one processor 152 and a memory 154. The at least one processor 152 is operable to execute program instructions stored in the memory 154 so as to carry out operations.

In some embodiments, the operations could include causing the lidar device 410 to scan a field of view 420 based on a scan timing sequence 430. In such scenarios, the scan timing sequence 430 could include a plurality of scan intervals 124. The operations may also include, during a given scan interval 124, causing the image sensor 110 to capture a full resolution image frame 130. The operations may additionally include, during the given scan interval 124, causing the image sensor 110 to capture at least one reduced resolution image frame 140. In some embodiments, the full resolution image frame 130 could be captured while the lidar device 410 is scanning the field of view 420. Additionally or alternatively, the at least one reduced resolution image frame 140 could be captured while the lidar device 410 is not scanning the field of view 420.

As illustrated in FIG. 4, in some embodiments, the controller 150 could transmit lidar control signals 158 to the lidar device 410. The lidar control signals 158 could be used so as to maintain and/or change and operation of the lidar device 410.

In some embodiments, the system 400 could be controlled according to operating scenarios 300, 320, and/or 330, corresponding to FIGS. 3A, 3B, and 3C.

IV. Example Methods

Figure 5:
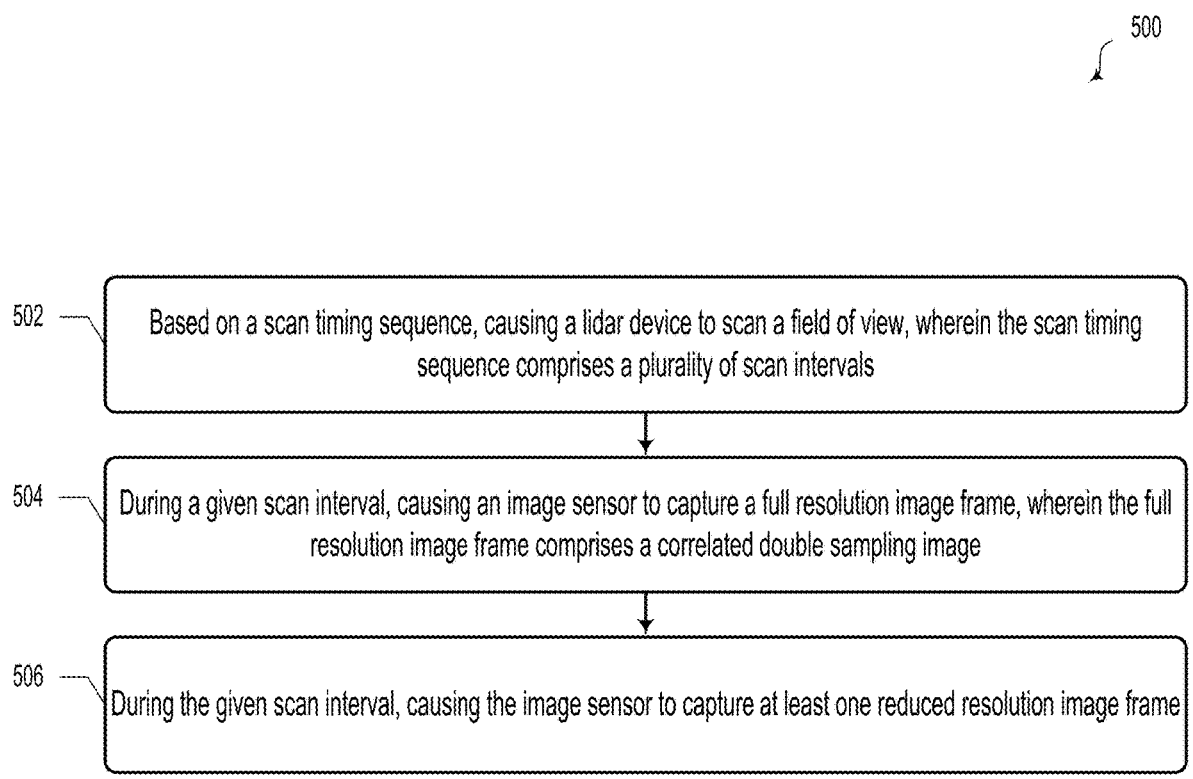
FIG. 5 illustrates a method, according to an example embodiment.

FIG. 5 illustrates a method 500, according to an example embodiment. It will be understood that the method 500 may include fewer or more steps or blocks than those expressly illustrated or otherwise disclosed herein. Furthermore, respective steps or blocks of method 500 may be performed in any order and each step or block may be performed one or more times. In some embodiments, some or all of the blocks or steps of method 500 may relate to elements of device 100 and/or system 400 as illustrated and described in relation to FIGS. 1 and 4. Some steps or blocks of method 500 could be illustrated and described in relation to FIGS. 3B-3C, 6, and 7.

Block 502 includes, based on a scan timing sequence (e.g., scan timing sequence 430), causing a lidar device (e.g., lidar device 410) to scan a field of view (e.g., field of view 420). The scan timing sequence includes a plurality of scan intervals (e.g., scan interval(s) 124).

Block 504 includes, during a given scan interval, causing an image sensor (e.g., image sensor 110) to capture a full resolution image frame (e.g., full resolution image frame 130). In such scenarios, the full resolution image frame could include a correlated double sampling image.

Block 506 includes, during the given scan interval, causing the image sensor to capture at least one reduced resolution image frame. In such scenarios, capturing the at least one reduced resolution image frame could include capturing a first reduced resolution image frame (e.g., first reduced resolution image frame 338a). In some examples, the first reduced resolution image frame could include a non-correlated double sampling image. Furthermore, capturing the at least one reduced resolution image frame could also include capturing a second reduced resolution image frame (e.g., second reduced resolution image frame 340a). In some embodiments, the second reduced resolution image frame could include a dark frame. The method 500 also includes performing a dark image subtraction on the first reduced resolution image frame based on the second reduced resolution image frame.

In some embodiments, the full resolution image frame could be captured while the lidar device is scanning the field of view. As an example, the at least one reduced resolution image frame could be captured while the lidar device need not be scanning the field of view.

In some embodiments, the given scan interval could be less than 40 milliseconds (e.g., 20-30 ms). However, other scan intervals are possible and contemplated.

Figure 6:
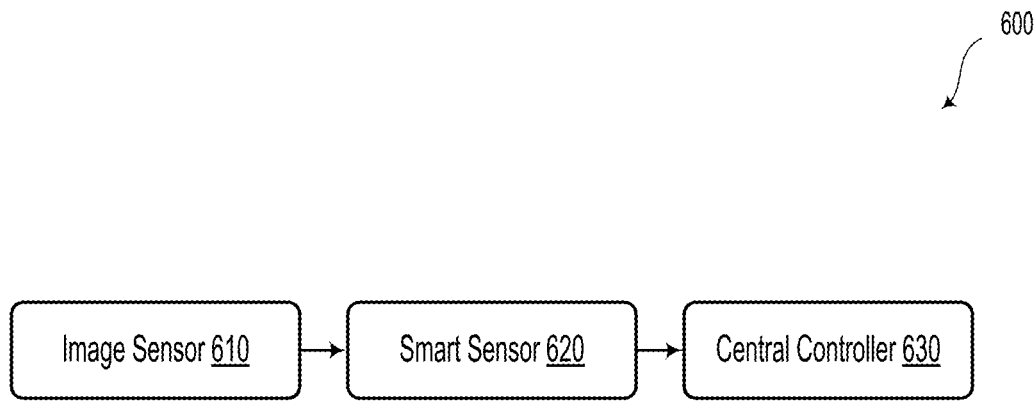
FIG. 6 illustrates an operating scenario, according to an example embodiment.

FIG. 6 illustrates an operating scenario 600, according to an example embodiment. Operating scenario 600 includes an image sensor 610, a smart sensor 620, and a central controller 630. The operating scenario 600 could include obtaining information (e.g., pixel charge amount) by using an image sensor 610. Thereafter, operating scenario 600 may include processing at least a portion of the obtained information using smart sensor 620. The smart sensor 620 could include one or more circuits configured to efficiently transmit and/or filter information provided by the image sensor 610 based on, for example, a desired field of view, before passing it along to the central controller 630. In turn, the central controller 630 could be to process the information and/or present the processed information to a user.

Figure 7:
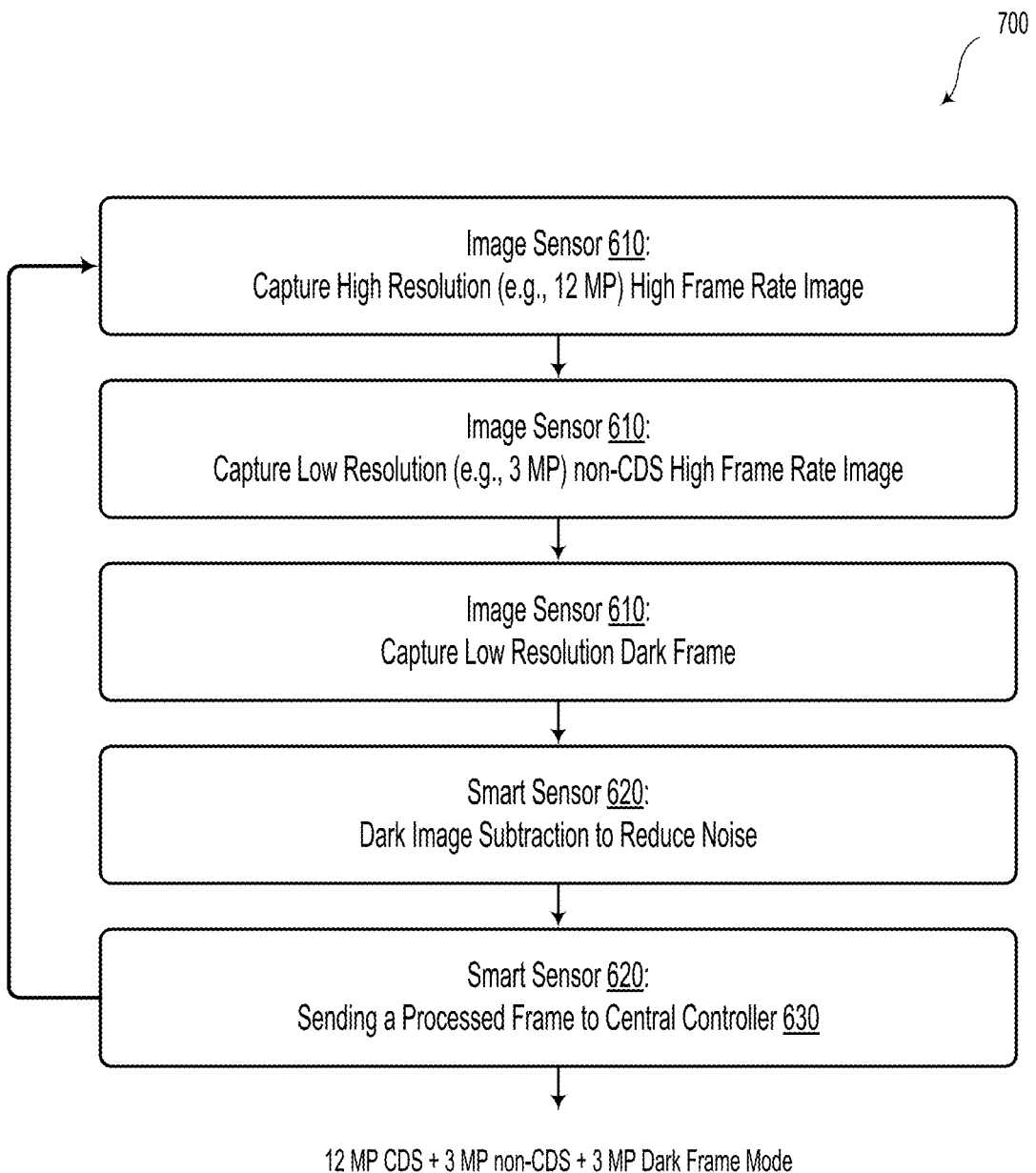
FIG. 7 illustrates an operating method, according to an example embodiment.

FIG. 7 illustrates an operating scenario 700, according to an example embodiment. In some embodiments, the operating scenario 700 could include an image sensor 610 capturing a high resolution image. Next, the image sensor 610 could capture a low resolution non-CDS image. Subsequently, the image sensor 610 could capture a low-resolution dark frame. As described herein, the dark frame could be captured with a closed charge transfer gate, TX. Such an image may include similar or identical noise information as a CDS image, providing a noise reference frame that may be subtracted from the low resolution non-CDS image.

In some embodiments, the smart sensor 620 could be configured to perform a dark image subtraction between the two low resolution images in an effort to reduce noise due to malfunctioning pixels and/or related read out circuitry. Thereafter, the smart sensor 620 could be configured to further adjust or finalize the image and send a processed frame to the central controller 630. After the processed frame is transmitted, this method could repeat again during a subsequent scan interval.

Figure 8:
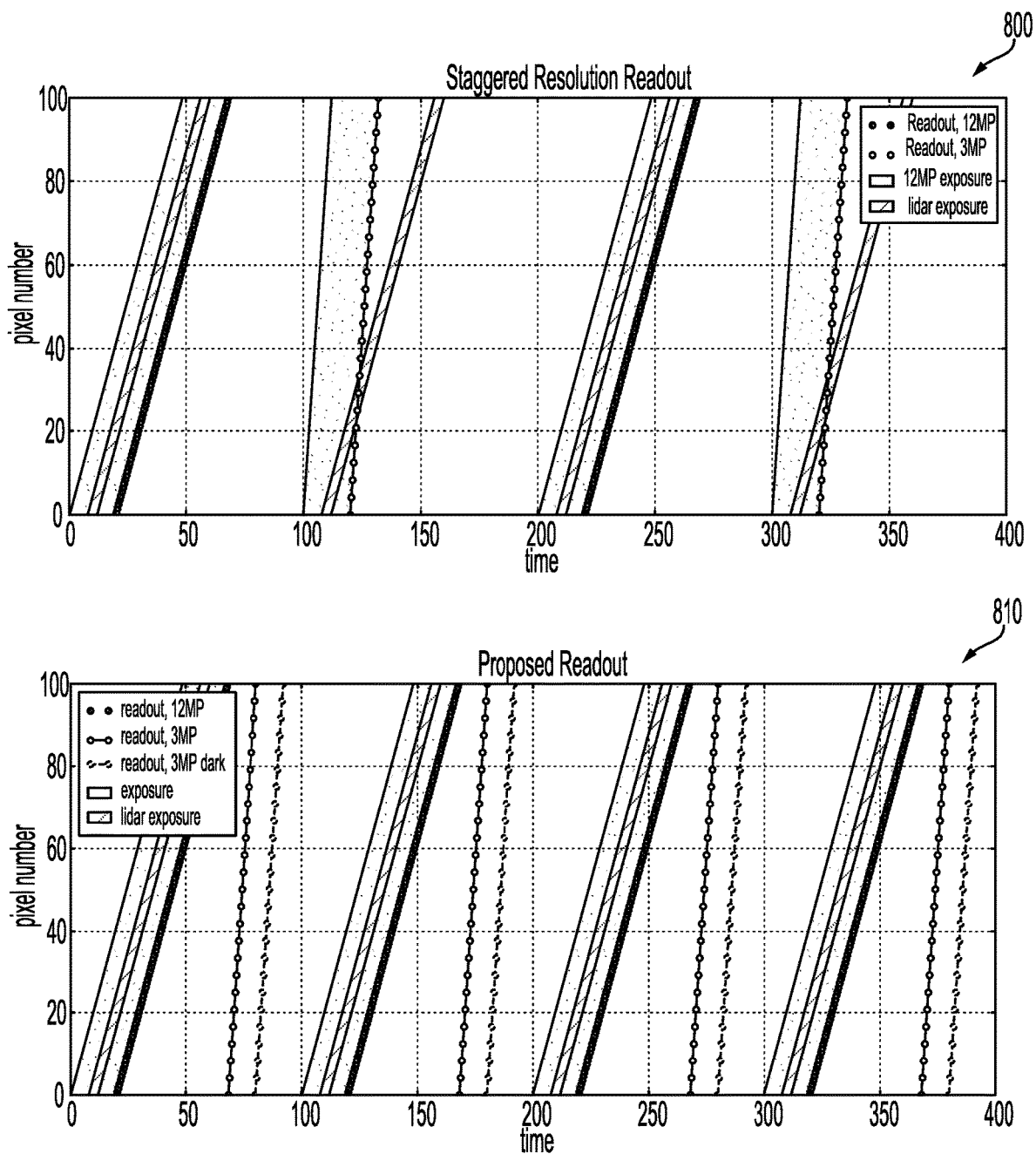
FIG. 8 illustrates operating scenarios, according to an example embodiment.

FIG. 8 illustrates operating scenarios 800 and 810, according to an example embodiment. Operating scenario 800 illustrates a serial image capture process similar or identical to that described in reference to FIG. 3A. In the serial image capture process, a CDS full resolution image frame is captured immediately followed by a CDS reduced resolution image frame. However, due to the length of time needed to do back-to-back CDS image frames, after the first full resolution image frame, subsequent image frames can be "out-of-sync" with respect to lidar scan intervals.

Operating scenario 810 illustrates a process similar or identical to that described in reference to FIG. 3C. In such embodiments, a CDS full resolution image frame (e.g., 12 megapixel resolution) could be captured, triggered by a rising or falling edge of a scan trigger pulse (e.g., trigger pulse 126). Afterward, a non-CDS reduced resolution image frame (e.g., 3 megapixel resolution) could be captured, followed by a reduced resolution dark frame. In such a manner, a CDS full resolution image frame and a non-CDS, dark-image-subtracted, reduced resolution image frame could be provided "in sync" with the lidar scan intervals.

It will be understood that while the respective image frames are captured in a particular order, other orders of image frame capture are contemplated and possible.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
   an image sensor; and
   a controller comprising at least one processor and a memory, wherein the at least one processor is operable to execute program instructions stored in the memory so as to carry out operations, the operations comprising:
   receiving a periodic signal defining at least one scan interval;
   during the scan interval, causing the image sensor to capture a full resolution image frame;
   receiving information indicative of a desired region of interest; and
   during the scan interval, causing the image sensor to capture at least one reduced resolution image frame, wherein causing the image sensor to capture at least one reduced resolution image frame comprises causing the image sensor to capture a further image frame corresponding to the desired region of interest during a given scan interval.

2. The device of claim 1, wherein the image sensor comprises a plurality of light-sensing elements, wherein the plurality of light-sensing elements are spatially grouped into a plurality of light-sensing regions, wherein the image sensor is configured to capture the full resolution image frame and a further image frame corresponding to at least one light-sensing element region during a single scan interval.

3. The device of claim 2, wherein the full resolution image frame is formed from information received from each of the plurality of light-sensing elements.

4. The device of claim 2, wherein the reduced resolution image frame is formed from information received from a subset of the plurality of light-sensing elements.

5. The device of claim 1, wherein the image sensor comprises at least 12 million light-sensing elements.

6. The device of claim 1, wherein the full resolution image frame comprises a correlated double sampling image.

7. The device of claim 1, wherein the reduced resolution image frame comprises a non-correlated double sampling image.

8. The device of claim 1, wherein capturing the at least one reduced resolution image frame comprises:
   capturing a first reduced resolution image frame, wherein the first reduced resolution image frame comprises a non-correlated double sampling image; and
   capturing a second reduced resolution image frame, wherein the second reduced resolution image frame comprises a dark frame.

9. The device of claim 8, wherein the operations further comprise:
   performing a dark image subtraction on the first reduced resolution image frame based on the second reduced resolution image frame.

10. The device of claim 1, wherein the scan interval is less than 40 milliseconds.

11. The device of claim 1, wherein the periodic signal is based on a plurality of scan intervals of a light detection and ranging (lidar) device.

12. The device of claim 11, wherein the full resolution image frame is captured while the lidar device is scanning a field of view.

13. The device of claim 12, wherein the at least one reduced resolution image frame is captured while the lidar device is not scanning the field of view.

14. A system comprising:
    an image sensor;
    a light detection and ranging (lidar) device; and
    a controller comprising at least one processor and a memory, wherein the at least one processor is operable to execute program instructions stored in the memory so as to carry out operations, the operations comprising:
    causing the lidar device to scan a field of view based on a plurality of scan intervals;
    during a given scan interval, causing the image sensor to capture a full resolution image frame; and
    during the given scan interval, causing the image sensor to capture at least one reduced resolution image frame.

15. The system of claim 14, wherein the full resolution image frame is captured while the lidar device is scanning the field of view.

16. The system of claim 14, wherein the at least one reduced resolution image frame is captured while the lidar device is not scanning the field of view.

17. A method comprising:
    causing a lidar device to scan a field of view during a plurality of scan intervals;
    during a given scan interval, causing an image sensor to capture a full resolution image frame, wherein the full resolution image frame comprises a correlated double sampling image; and
    during the given scan interval, causing the image sensor to capture at least one reduced resolution image frame.

18. The method of claim 17, wherein capturing the at least one reduced resolution image frame comprises:
    capturing a first reduced resolution image frame, wherein the first reduced resolution image frame comprises a non-correlated double sampling image; and
    capturing a second reduced resolution image frame, wherein the second reduced resolution image frame comprises a dark frame, and wherein the method further comprises performing a dark image subtraction on the first reduced resolution image frame based on the second reduced resolution image frame.

19. The method of claim 17, wherein the full resolution image frame is captured while the lidar device is scanning the field of view, wherein the at least one reduced resolution image frame is captured while the lidar device is not scanning the field of view.

20. The method of claim 17, wherein the given scan interval is less than 40 milliseconds.

* * * * *